US012626684B2

(12) United States Patent
Kurihara

(10) Patent No.: US 12,626,684 B2
(45) Date of Patent: May 12, 2026

(54) EAR-WORN DEVICE AND REPRODUCTION METHOD

(71) Applicant: Panasonic Intellectual Property Management Co., Ltd., Osaka (JP)

(72) Inventor: Shinichiro Kurihara, Hyogo (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 166 days.

(21) Appl. No.: 18/745,000

(22) Filed: Jun. 17, 2024

(65) Prior Publication Data

US 2024/0339101 A1 Oct. 10, 2024

Related U.S. Application Data

(63) Continuation of application No. PCT/JP2022/035130, filed on Sep. 21, 2022.

(30) Foreign Application Priority Data

Dec. 21, 2021 (JP) ................................ 2021-207539

(51) Int. Cl.

*G10K 11/178* (2006.01)
*H04R 1/08* (2006.01)
(Continued)

(52) U.S. Cl.

CPC ......... *G10K 11/17827* (2018.01); *H04R 1/08* (2013.01); *H04R 1/1091* (2013.01); *H04R 3/00* (2013.01); *H04R 2460/01* (2013.01)

(58) Field of Classification Search

CPC ......... G10K 11/17827; G10K 11/1783; G10K 11/17837; G10K 11/17873;
(Continued)

(56) References Cited

U.S. PATENT DOCUMENTS

| | | | |
|---|---|---|---|
| 8,340,319 | B2 | 12/2012 | Kinouchi et al. |
| 8,761,406 | B2 | 6/2014 | Ohkuri et al. |

(Continued)

FOREIGN PATENT DOCUMENTS

| | | |
|---|---|---|
| JP | 2009-21826 | 1/2009 |
| JP | 2009-302991 | 12/2009 |
| JP | 2012-249184 | 12/2012 |
| WO | 2019/111050 | 6/2019 |

OTHER PUBLICATIONS

International Search Report (ISR) issued on Nov. 1, 2022 in International (PCT) Application No. PCT/JP2022/035130.

*Primary Examiner* — David L Ton

(74) *Attorney, Agent, or Firm* — Wenderoth, Lind & Ponack, L.L.P.

(57) ABSTRACT

An ear-worn device includes: a microphone that obtains a sound and outputs a first sound signal of the sound obtained; a DSP that performs determination regarding an S/N ratio of the first sound signal, determination regarding a bandwidth with respect to a peak frequency in a power spectrum of the sound, and determination of whether the sound contains human voice, and outputs a second sound signal based on the first sound signal when the DSP determines that at least one of the S/N ratio or the bandwidth satisfies a predetermined requirement and the sound contains human voice; a loudspeaker that outputs a reproduced sound based on the second sound signal output; and a housing that contains the microphone, the DSP, and the loudspeaker.

10 Claims, 8 Drawing Sheets

(51) Int. Cl.
*H04R 1/10* (2026.01)
*H04R 3/00* (2006.01)

(58) Field of Classification Search
CPC ............ G10L 21/0232; G10L 21/0364; H04R 1/08; H04R 1/1016; H04R 1/1041; H04R 1/1083; H04R 1/1091; H04R 3/00; H04R 2460/01; H04R 2430/01
See application file for complete search history.

(56) References Cited

U.S. PATENT DOCUMENTS

| | | | | |
|---|---|---|---|---|
| 11,276,384 | B2 * | 3/2022 | Woodruff | H04R 1/1083 |
| 2009/0245529 | A1 * | 10/2009 | Asada | G10K 11/17833 381/71.6 |
| 2010/0184487 | A1 * | 7/2010 | Takada | H04R 3/00 381/104 |
| 2017/0142522 | A1 * | 5/2017 | Hayashi | G10K 11/17875 |
| 2019/0028803 | A1 * | 1/2019 | Benattar | H04S 7/304 |
| 2019/0251955 | A1 | 8/2019 | Degraye et al. | |
| 2023/0239617 | A1 * | 7/2023 | Kurihara | H04R 1/1041 |
| 2023/0320903 | A1 * | 10/2023 | Kurihara | G10K 11/17873 |

* cited by examiner

EAR-WORN DEVICE AND REPRODUCTION METHOD

CROSS REFERENCE TO RELATED APPLICATIONS

This is a continuation application of PCT International Application No. PCT/JP2022/035130 filed on Sep. 21, 2022, designating the United States of America, which is based on and claims priority of Japanese Patent Application No. 2021-207539 filed on Dec. 21, 2021. The entire disclosures of the above-identified applications, including the specifications, drawings and claims are incorporated herein by reference in their entirety.

FIELD

The present disclosure relates to an ear-worn device and a reproduction method.

BACKGROUND

Various techniques for ear-worn devices such as earphones and headphones have been proposed. Patent Literature (PTL) 1 discloses a technique for headphones.

CITATION LIST

Patent Literature

PTL 1: Japanese Unexamined Patent Application Publication No. 2009-21826

SUMMARY

Technical Problem

The present disclosure provides an ear-worn device that can reproduce human voice heard in the surroundings.

Solution to Problem

An ear-worn device according to an aspect of the present disclosure includes: a microphone that obtains a sound and outputs a first sound signal of the sound obtained; a signal processing circuit that performs determination regarding a signal-to-noise (S/N) ratio of the first sound signal, determination regarding a bandwidth with respect to a peak frequency in a power spectrum of the sound, and determination of whether the sound contains human voice, and outputs a second sound signal based on the first sound signal when the signal processing circuit determines that at least one of the S/N ratio or the bandwidth satisfies a predetermined requirement and the sound contains human voice; a loudspeaker that outputs a reproduced sound based on the second sound signal output; and a housing that contains the microphone, the signal processing circuit, and the loudspeaker.

Advantageous Effects

The ear-worn device according to an aspect of the present disclosure can reproduce human voice heard in the surroundings.

BRIEF DESCRIPTION OF DRAWINGS

These and other advantages and features will become apparent from the following description thereof taken in conjunction with the accompanying Drawings, by way of non-limiting examples of embodiments disclosed herein.

DESCRIPTION OF EMBODIMENTS

Figure 1:
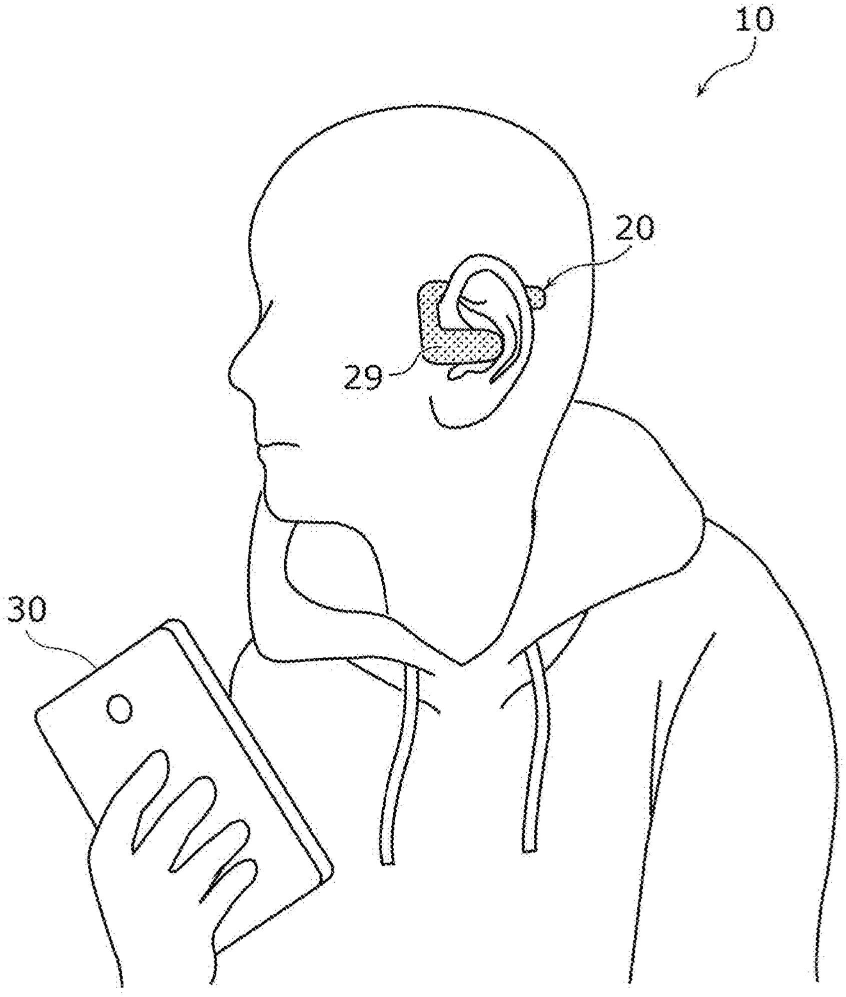
FIG. 1 is an external view of devices included in a sound signal processing system according to an embodiment.

An embodiment will be described in detail below, with reference to the drawings. The embodiment described below shows a general or specific example. The numerical values, shapes, materials, structural elements, the arrangement and connection of the structural elements, steps, the order of steps, etc. shown in the following embodiment are mere examples, and do not limit the scope of the present disclosure. Of the structural elements in the embodiment described below, the structural elements not recited in any one of the independent claims are described as optional structural elements.

Each drawing is a schematic, and does not necessarily provide precise depiction. In the drawings, structural elements that are substantially the same are given the same reference marks, and repeated description may be omitted or simplified.

Embodiment

1. Structure

Figure 2:
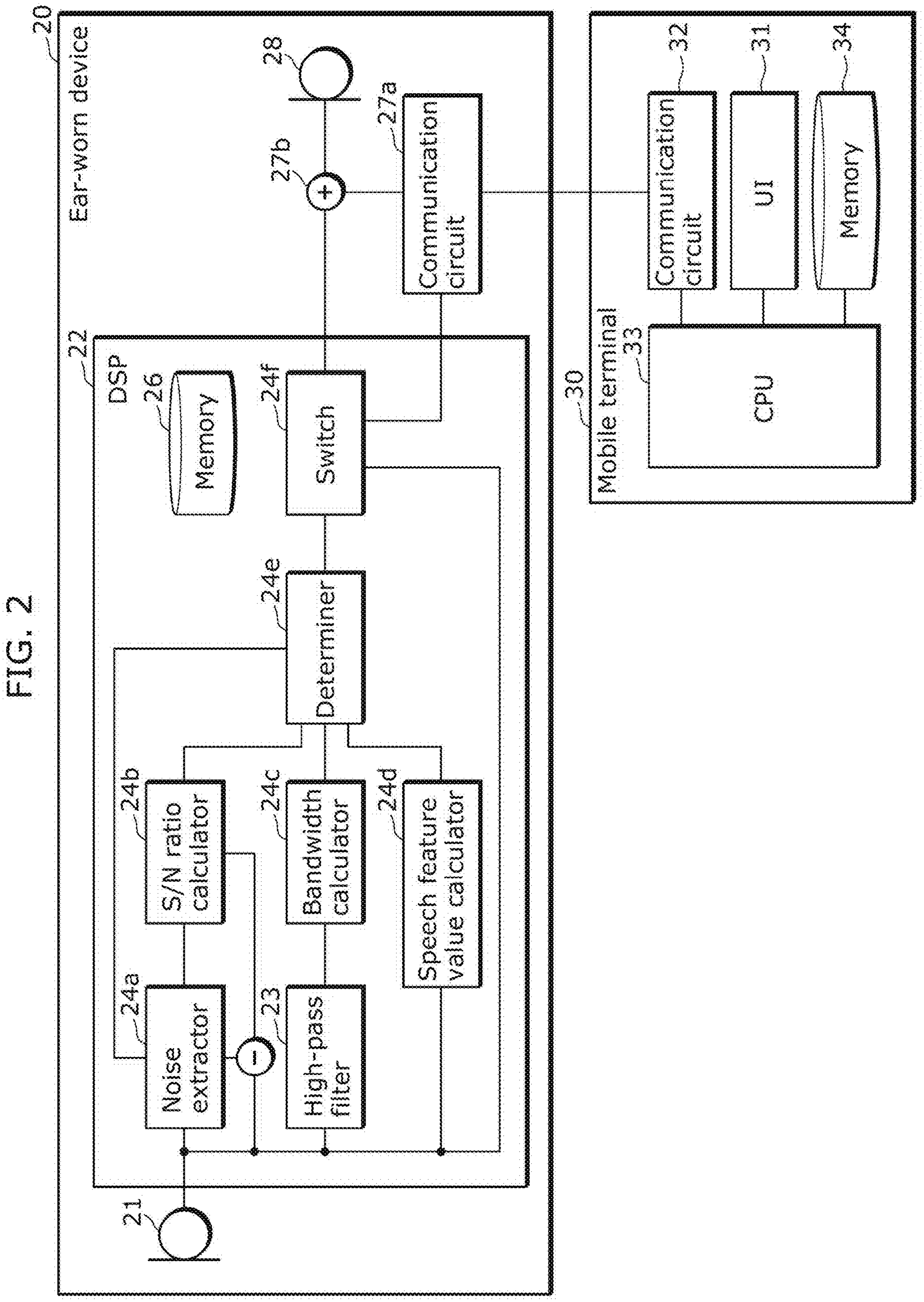
FIG. 2 is a block diagram illustrating the functional structure of the sound signal processing system according to the embodiment.

The structure of a sound signal processing system according to an embodiment will be described below. FIG. 1 is an external view of devices included in the sound signal processing system according to the embodiment. FIG. 2 is a block diagram illustrating the functional structure of the sound signal processing system according to the embodiment.

As illustrated in FIG. 1 and FIG. 2, sound signal processing system 10 according to the embodiment includes ear-worn device 20 and mobile terminal 30. First, ear-worn device 20 will be described below.

1-1. Structure of Ear-Worn Device

Ear-worn device 20 is an earphone-type device that reproduces a fourth sound signal provided from mobile terminal 30. The fourth sound signal is, for example, a sound signal of music content. Ear-worn device 20 has an external sound capture function (also referred to as "external sound capture mode") of capturing a sound around the user (i.e. ambient sound) during the reproduction of the fourth sound signal.

Herein, the "ambient sound" is, for example, an announcement sound. For example, the announcement sound is a sound output, in a mobile body such as a train, a bus, or an airplane, from a loudspeaker installed in the mobile body. The announcement sound contains human voice.

Ear-worn device 20 operates in a normal mode in which the fourth sound signal provided from mobile terminal 30 is reproduced, and the external sound capture mode in which a sound around the user is captured and reproduced. For example, in the case where, when the user wearing ear-worn device 20 is on a moving mobile body and is listening to music content in the normal mode, an announcement sound is output in the mobile body and the output announcement sound contains human voice, ear-worn device 20 automatically transitions from the normal mode to the external sound capture mode. This prevents the user from missing the announcement sound.

Specifically, ear-worn device 20 includes microphone 21, DSP 22, communication circuit 27*a*, mixing circuit 27*b*, and loudspeaker 28. Communication circuit 27*a* and mixing circuit 27*b* may be included in DSP 22. Microphone 21, DSP 22, communication circuit 27*a*, mixing circuit 27*b*, and loudspeaker 28 are contained in housing 29 (illustrated in FIG. 1).

Microphone 21 is a sound pickup device that obtains a sound around ear-worn device 20 and outputs a first sound signal based on the obtained sound. Non-limiting specific examples of microphone 21 include a condenser microphone, a dynamic microphone, and a microelectromechanical systems (MEMS) microphone. Microphone 21 may be omnidirectional or may have directivity.

DSP 22 performs signal processing on the first sound signal output from microphone 21 to realize the external sound capture function. For example, DSP 22 realizes the external sound capture function by outputting a second sound signal based on the first sound signal to loudspeaker 28. DSP 22 also has a noise canceling function, and can output, to loudspeaker 28, a third sound signal obtained by performing signal processing including phase inversion processing on the first sound signal. DSP 22 is an example of a signal processing circuit. Specifically, DSP 22 includes high-pass filter 23, noise extractor 24*a*, S/N ratio calculator 24*b*, bandwidth calculator 24*c*, speech feature value calculator 24*d*, determiner 24*e*, switch 24*f*, and memory 26.

High-pass filter 23 attenuates a component in a band of 512 Hz or less contained in the first sound signal output from microphone 21. High-pass filter 23 is, for example, a nonlinear digital filter. The cutoff frequency of high-pass filter 23 is an example, and the cutoff frequency may be determined empirically or experimentally. For example, the cutoff frequency may be determined according to the type of the mobile body in which ear-worn device 20 is expected to be used.

Noise extractor 24*a*, S/N ratio calculator 24*b*, bandwidth calculator 24*c*, speech feature value calculator 24*d*, determiner 24*e*, and switch 24*f* are functional structural elements. The functions of these structural elements are implemented, for example, by DSP 22 executing a computer program stored in memory 26. The functions of noise extractor 24*a*, S/N ratio calculator 24*b*, bandwidth calculator 24*c*, speech feature value calculator 24*d*, determiner 24*e*, and switch 24*f* will be described in detail later.

Memory 26 is a storage device that stores the computer program executed by DSP 22, various information necessary for implementing the external sound capture function, and the like. Memory 26 is implemented by semiconductor memory or the like.

Memory 26 may be implemented not as internal memory of DSP 22 but as external memory of DSP 22.

Communication circuit 27*a* receives the fourth sound signal from mobile terminal 30. Communication circuit 27*a* is, for example, a wireless communication circuit, and communicates with mobile terminal 30 based on a communication standard such as Bluetooth® or Bluetooth® Low Energy (BLE).

Mixing circuit 27*b* mixes the second sound signal or the third sound signal output from DSP 22 with the fourth sound signal received by communication circuit 27*a*, and outputs the mixed sound signal to loudspeaker 28. Communication circuit 27*a* and mixing circuit 27*b* may be implemented as one system-on-a-chip (SoC).

Loudspeaker 28 outputs a reproduced sound based on the mixed sound signal obtained from mixing circuit 27*b*. Loudspeaker 28 is a loudspeaker that emits sound waves toward the earhole (eardrum) of the user wearing ear-worn device 20. Alternatively, loudspeaker 28 may be a bone-conduction loudspeaker.

1-2. Structure of Mobile Terminal

Next, mobile terminal 30 will be described below. Mobile terminal 30 is an information terminal that functions as a user interface device in sound signal processing system 10 as a result of a predetermined application program being installed therein. Mobile terminal 30 also functions as a sound source that provides the fourth sound signal (music content) to ear-worn device 20. By operating mobile terminal 30, the user can, for example, select music content reproduced by loudspeaker 28 and switch the operation mode of ear-worn device 20. Mobile terminal 30 includes user interface (UI) 31, communication circuit 32, CPU 33, and memory 34.

UI 31 is a user interface device that receives operations by the user and presents images to the user. UI 31 is implemented by an operation receiver such as a touch panel and a display such as a display panel. UI 31 may be a voice UI that receives the user's voice. In this case, UI 31 is implemented by a microphone and a loudspeaker.

Communication circuit 32 transmits the fourth sound signal which is a sound signal of music content selected by the user, to ear-worn device 20. Communication circuit 32 is, for example, a wireless communication circuit, and communicates with ear-worn device 20 based on a communication standard such as Bluetooth® or Bluetooth® Low Energy (BLE).

CPU 33 performs information processing relating to displaying an image on the display, transmitting the fourth sound signal using communication circuit 32, etc. CPU 33 is, for example, implemented by a microcomputer. Alternatively, CPU 33 may be implemented by a processor. The image display function, the fourth sound signal transmission function, and the like are implemented by CPU 33 executing a computer program stored in memory 34.

Memory 34 is a storage device that stores various information necessary for CPU 33 to perform information processing, the computer program executed by CPU 33, the fourth sound signal (music content), and the like. Memory 34 is, for example, implemented by semiconductor memory.

2. Overview of Operation

As mentioned above, ear-worn device 20 can automatically transition to the external sound capture mode when, while the user is on a mobile body, an announcement sound is output in the mobile body. For example, when the signal-to-noise (S/N) ratio of the sound signal of the sound obtained by microphone 21 is relatively high and the sound contains human voice, it is assumed that an announcement sound (relatively loud human voice) is output while the mobile body is moving (traveling).

When the S/N ratio of the sound signal of the sound obtained by microphone 21 is relatively low and the sound contains human voice, on the other hand, it is assumed that passengers talking (relatively soft human voice) is heard while the mobile body is moving.

The external sound capture mode is an operation mode that makes it easier to hear announcement sounds rather than passengers talking, as mentioned above. Ear-worn device 20 is therefore supposed to operate in the external sound capture mode when the S/N ratio of the sound signal of the sound obtained by microphone 21 is higher than a threshold (hereafter also referred to as "first threshold") and the sound contains human voice.

Figure 3:
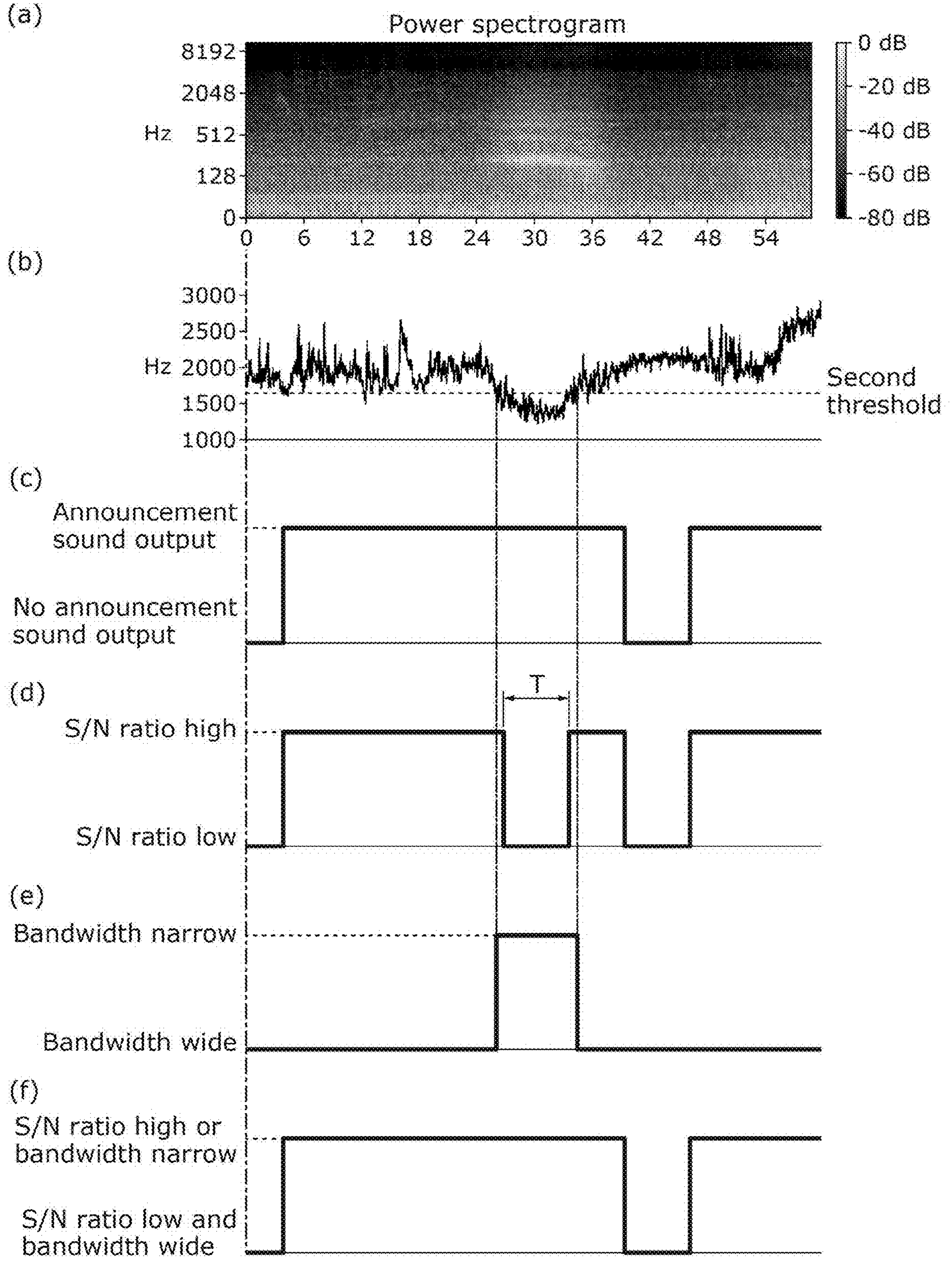
FIG. 3 is a diagram for explaining a case in which a transition to an external sound capture mode does not occur even when an announcement sound is output.

However, there is a possibility that ear-worn device 20 with such a structure does not transition to the external sound capture mode even when an announcement sound is output. FIG. 3 is a diagram for explaining such a case.

(a) in FIG. 3 is a diagram illustrating temporal changes in the power spectrum of a sound obtained by microphone 21. The vertical axis represents frequency, and the horizontal axis represents time. In (a) in FIG. 3, whiter parts have higher power, and blacker parts have lower power.

(b) in FIG. 3 is a diagram illustrating temporal changes in bandwidth with respect to the peak frequency (frequency at which the power is maximum) in the power spectrum in (a) in FIG. 3. The vertical axis represents bandwidth, and the horizontal axis represents time. The peak frequency is, more specifically, a peak frequency in a frequency band of 512 Hz or more, as described later.

(c) in FIG. 3 illustrates periods during which an announcement sound is actually output. (d) in FIG. 3 illustrates periods during which the S/N ratio of the sound signal of the sound obtained by microphone 21 is higher than the first threshold. In period T in (d) in FIG. 3, the S/N ratio is determined to be lower than the first threshold. However, an announcement sound is output during period T, as illustrated in (c) in FIG. 3. Thus, with the structure of operating in the external sound capture mode when the S/N ratio of the sound signal of the sound obtained by microphone 21 is higher than the first threshold and the sound contains human voice, the ear-worn device does not operate in the external sound capture mode during period T.

The reason why the S/N ratio is low in period T is presumed to be because, while an announcement sound is output, the noise caused by the movement of the mobile body is louder than the announcement sound. In a period during which prominent noise with a narrow bandwidth (hereafter also referred to as "maximum noise") occurs as illustrated in (b) in FIG. 3, the S/N ratio is low even when an announcement sound is output.

In view of this, in addition to determining whether the S/N ratio is higher than the first threshold, ear-worn device 20 determines whether the bandwidth is narrower than a threshold (hereafter also referred to as "second threshold"). (e) in FIG. 3 illustrates a period during which the bandwidth is narrower than the second threshold. Ear-worn device 20 regards a period during which the bandwidth is narrower than the second threshold as a period during which an announcement sound may be output even if the S/N ratio is not higher than the first threshold. (f) in FIG. 3 illustrates periods that are, based on both the S/N ratio and the bandwidth, determined to be periods during which an announcement sound may be output. These periods include the periods during which an announcement sound is actually output as illustrated in (c) in FIG. 3.

Hence, by performing not only the determination regarding the S/N ratio but also the determination regarding the bandwidth, ear-worn device 20 can avoid failing to operate in the external sound capture mode despite an announcement sound being output.

3. Example 1

Figure 4:
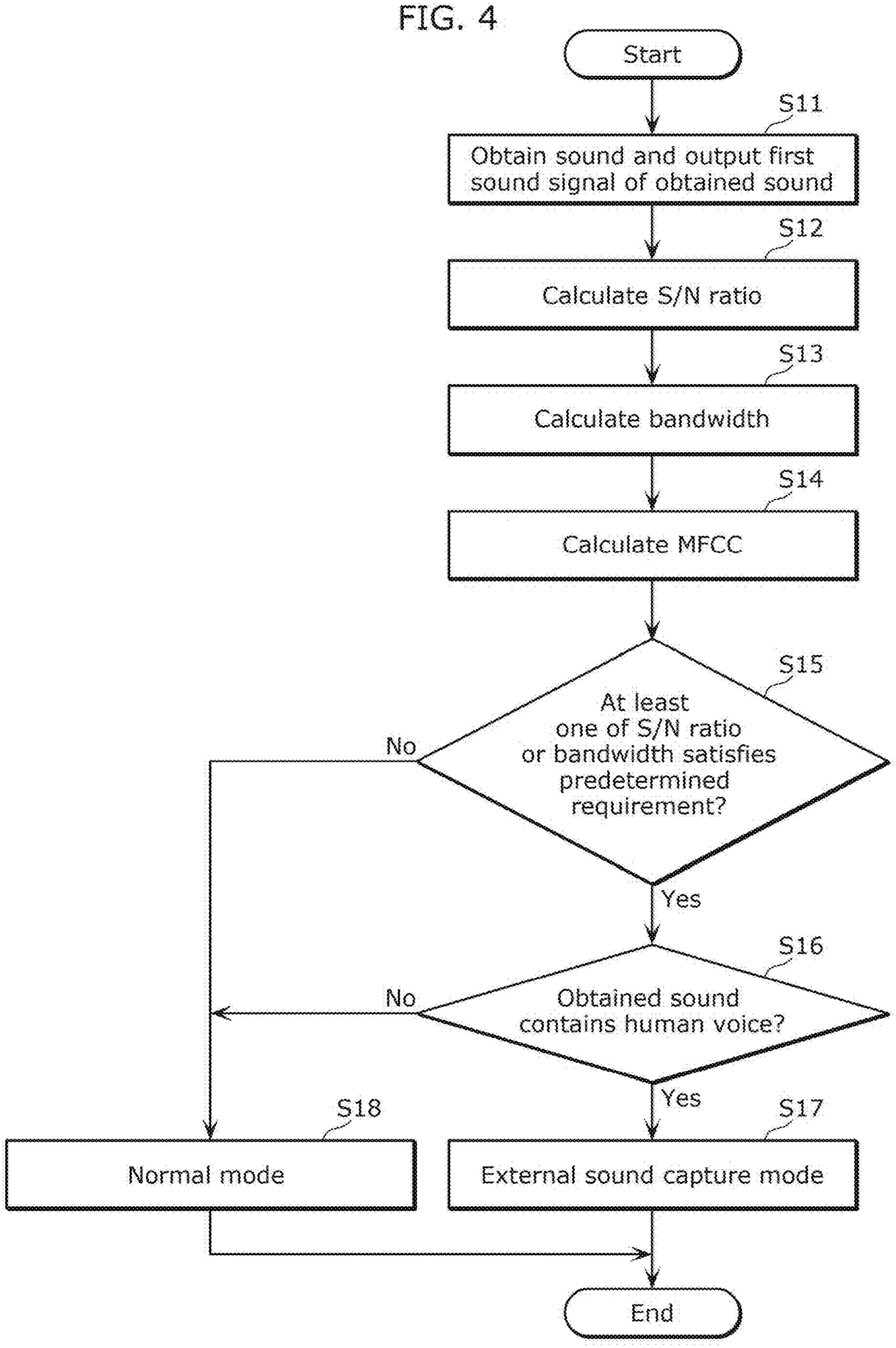
FIG. 4 is a flowchart of Example 1 of an ear-worn device according to the embodiment.

A plurality of examples of ear-worn device 20 will be described below, taking specific situations as examples. First, Example 1 of ear-worn device 20 will be described below. FIG. 4 is a flowchart of Example 1 of ear-worn device 20. Example 1 is an example of operation when the user wearing ear-worn device 20 is on a mobile body.

Microphone 21 obtains a sound, and outputs a first sound signal of the obtained sound (S11). S/N ratio calculator 24*b* calculates the S/N ratio based on the noise component of the first sound signal output from microphone 21 and the signal component obtained by subtracting the noise component from the first sound signal (S12). Here, the noise component is extracted by noise extractor 24*a*. The extraction of the noise component is based on the method of estimating the power spectrum of the noise component, which is used in the spectral subtraction method. The S/N ratio calculated in Step S12 is, for example, a parameter obtained by dividing the average value of the power of the signal component in the frequency domain by the average value of the power of the noise component in the frequency domain.

In more detail, the spectral subtraction method is a method that subtracts, from the power spectrum of a sound signal containing a noise component, the estimated power spectrum of the noise component and performs an inverse Fourier transform on the power spectrum of the sound signal from which the power spectrum of the noise component has been subtracted to obtain the sound signal (the foregoing signal component) from which the noise component has been reduced. The power spectrum of the noise component can be estimated based on a signal belonging to a non-speech segment (a segment that is mostly composed of a noise component with little signal component) of the sound signal.

The non-speech segment may be identified in any way. For example, the non-speech segment is identified based on the determination result of determiner 24*e*. Determiner 24*e* determines whether the sound obtained by microphone 21 contains human voice, as described later. Noise extractor 24*a* can use each segment determined to not contain human voice by determiner 24*e*, as the non-speech segment.

Next, bandwidth calculator 24*c* calculates the bandwidth with respect to the peak frequency in the power spectrum of the sound obtained by microphone 21, by performing signal processing on the first sound signal to which high-pass filter 23 has been applied (S13).

Specifically, bandwidth calculator 24*c* calculates the power spectrum of the sound by Fourier transforming the first sound signal to which high-pass filter 23 has been applied, and identifies the peak frequency (frequency at which the power is maximum) in the spectrum of the sound. Bandwidth calculator 24*c* also identifies, as a lower limit frequency, a frequency that is lower than the peak frequency in the power spectrum and at which the power decreases by a predetermined proportion (for example, 80%) from the peak frequency, with the power at the peak frequency as a reference (100%) (i.e. with respect to the power at the peak frequency). Bandwidth calculator 24*c* further identifies, as an upper limit frequency, a frequency that is higher than the peak frequency in the power spectrum and at which the power decreases by a predetermined proportion (for example, 80%) from the peak frequency, with the power at the peak frequency as a reference. Bandwidth calculator 24*c* can then calculate the width from the lower limit frequency to the upper limit frequency as the bandwidth.

Next, speech feature value calculator 24*d* performs signal processing on the first sound signal output from microphone 21, to calculate a mel-frequency cepstral coefficient (MFCC) (S14). The MFCC is a cepstral coefficient used as a feature value in speech recognition and the like, and is obtained by converting a power spectrum compressed using a mel-filter bank into a logarithmic power spectrum and applying an inverse discrete cosine transform to the logarithmic power spectrum. Speech feature value calculator 24*d* outputs the calculated MFCC to determiner 24*e*.

Next, determiner 24*e* determines whether at least one of the S/N ratio calculated in Step S12 or the bandwidth calculated in Step S13 satisfies a predetermined requirement (S15). The predetermined requirement for the S/N ratio is that the S/N ratio is higher than the first threshold. The predetermined requirement for the bandwidth is that the bandwidth is narrower than the second threshold. In other words, determiner 24*e* determines in Step S15 whether at least one of the requirement that the S/N ratio calculated in Step S12 is higher than the first threshold or the requirement that the bandwidth calculated in Step S13 is narrower than the second threshold is satisfied. The first threshold and the second threshold are appropriately determined empirically or experimentally.

When determiner 24*e* determines that at least one of the S/N ratio or the bandwidth satisfies the predetermined requirement (S15: Yes), determiner 24*e* determines whether the sound obtained by microphone 21 contains human voice based on the MFCC calculated by speech feature value calculator 24*d* (S16).

For example, determiner 24*e* includes a machine learning model (neural network) that receives the MFCC as input and outputs a determination result of whether the sound contains human voice, and determines whether the sound obtained by microphone 21 contains human voice using the machine learning model. The human voice herein is assumed to be human voice contained in an announcement sound.

When determiner 24*e* determines that the sound obtained by microphone 21 contains human voice (S16: Yes), switch 24*f* switches the operation mode from the normal mode to the external sound capture mode and operates in the external sound capture mode (S17). In other words, when determiner 24*e* determines that at least one of the S/N ratio or the bandwidth satisfies the predetermined requirement (S15: Yes) and human voice is output (S16: Yes), ear-worn device 20 (switch 24*f*) operates in the external sound capture mode (S17).

Figure 5:
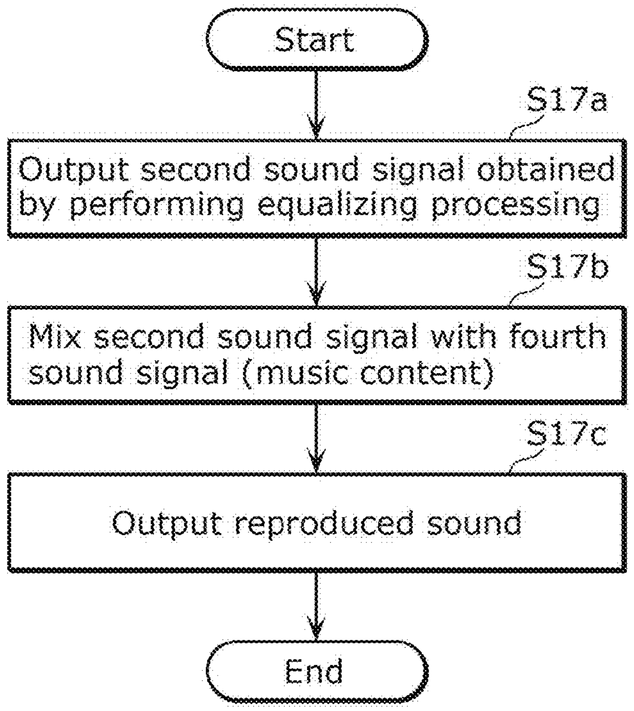
FIG. 5 is a first flowchart of the operation of the ear-worn device according to the embodiment in the external sound capture mode.

FIG. 5 is a first flowchart of operation in the external sound capture mode. In the external sound capture mode, switch 24*f* generates a second sound signal by performing equalizing processing for enhancing a specific frequency component on the first sound signal output from microphone 21, and outputs the generated second sound signal (S17*a*). For example, the specific frequency component is a frequency component of 100 Hz or more and 2 kHz or less. By enhancing the band corresponding to the frequency band of human voice in this way, human voice is enhanced. Thus, the announcement sound (more specifically, the human voice contained in the announcement sound) is enhanced.

Mixing circuit 27*b* mixes the second sound signal with the fourth sound signal (music content) received by communication circuit 27*a*, and outputs the resultant sound signal to loudspeaker 28 (S17*b*). Loudspeaker 28 outputs a reproduced sound based on the second sound signal mixed with the fourth sound signal (S17*c*). Since the announcement sound is enhanced as a result of the process in Step S17*a*, the user of ear-worn device 20 can easily hear the announcement sound.

When determiner 24*e* determines that neither the S/N ratio nor the bandwidth satisfies the predetermined requirement (S15 in FIG. 4: No) and when determiner 24*e* determines that the sound does not contain human voice (S15: Yes, and S16: No), switch 24*f* operates in the normal mode (S18). Loudspeaker 28 outputs the reproduced sound (music content) of the fourth sound signal received by communication circuit 27*a*, and does not output the reproduced sound based on the second sound signal. In other words, switch 24*f* causes loudspeaker 28 not to output the reproduced sound based on the second sound signal.

The above-described process illustrated in the flowchart in FIG. 4 is repeatedly performed at predetermined time intervals. That is, which of the normal mode and the external sound capture mode ear-worn device 20 is to operate in is determined at predetermined time intervals. The predetermined time interval is, for example, 1/60 seconds.

As described above, DSP 22 performs the determination regarding the S/N ratio of the first sound signal of the sound obtained by microphone 21, the determination regarding the bandwidth with respect to the peak frequency in the power spectrum of the sound, and the determination of whether the sound contains human voice. When DSP 22 determines that at least one of the S/N ratio or the bandwidth satisfies the predetermined requirement and the sound contains human voice, DSP 22 outputs the second sound signal based on the first sound signal. Specifically, DSP 22 outputs the second sound signal obtained by performing signal processing on the first sound signal. The signal processing includes equalizing processing for enhancing the specific frequency component of the sound. When DSP 22 determines that neither the S/N ratio nor the bandwidth satisfies the predetermined requirement and when DSP 22 determines that the sound does not contain human voice, DSP 22 causes loudspeaker 28 not to output the reproduced sound based on the second sound signal.

Thus, ear-worn device 20 can assist the user who is on the mobile body in hearing an announcement sound while the mobile body is moving. The user is unlikely to miss the announcement sound even when immersed in music content. Moreover, by performing not only the determination regarding the S/N ratio but also the determination regarding the bandwidth, ear-worn device 20 can avoid failing to operate in the external sound capture mode despite an announcement sound being output.

The operation in the external sound capture mode is not limited to the operation illustrated in FIG. 5. For example, the equalizing processing in Step S17*a* is not essential, and the second sound signal may be generated by performing signal processing of increasing the gain (amplitude) of the first sound signal. Signal processing performed on the first sound signal to generate the second sound signal does not include phase inversion processing. Moreover, it is not essential to perform signal processing on the first sound signal in the external sound capture mode.

Figure 6:
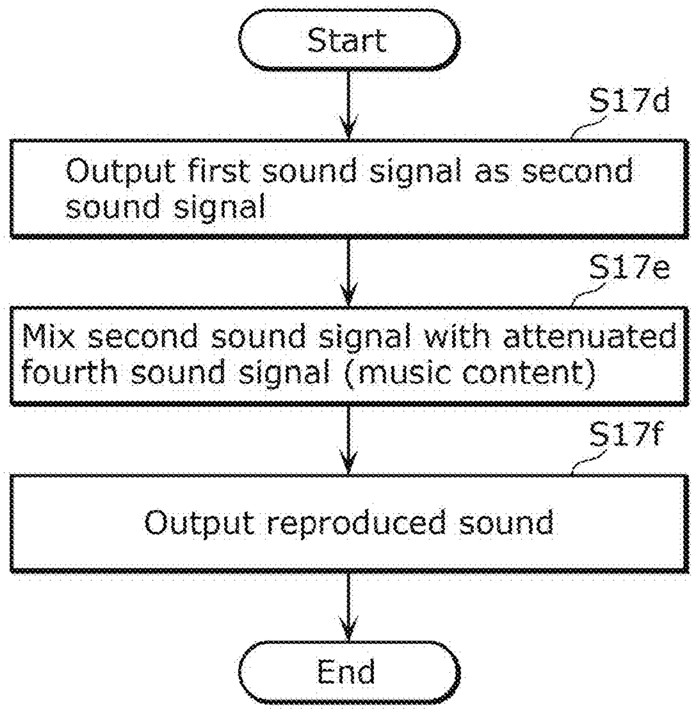
FIG. 6 is a second flowchart of the operation of the ear-worn device according to the embodiment in the external sound capture mode.

FIG. 6 is a second flowchart of operation in the external sound capture mode. In the example in FIG. 6, switch 24*f* outputs the first sound signal output from microphone 21, as the second sound signal (S17*d*). That is, switch 24*f* outputs substantially the first sound signal itself as the second sound signal. Switch 24*f* also instructs mixing circuit 27*b* to attenuate (i.e. gain decrease, amplitude attenuation) the fourth sound signal during the mixing.

Mixing circuit 27*b* mixes the second sound signal with the fourth sound signal (music content) attenuated to be lower in amplitude than in the normal mode, and outputs the resultant sound signal to loudspeaker 28 (S17*e*). Loudspeaker 28 outputs a reproduced sound based on the second sound signal mixed with the fourth sound signal attenuated in amplitude (S17*f*).

Thus, in the external sound capture mode after DSP 22 starts outputting the second sound signal, the second sound signal may be mixed with the fourth sound signal attenuated to be lower in amplitude than in the normal mode before DSP 22 starts outputting the second sound signal. Consequently, the announcement sound is enhanced, so that the user of ear-worn device 20 can easily hear the announcement sound.

The operation in the external sound capture mode is not limited to the operations illustrated in FIG. 5 and FIG. 6. For example, in the operation in the external sound capture mode in FIG. 5, the second sound signal generated by performing equalizing processing or gain increase processing on the first sound signal may be mixed with the attenuated fourth sound signal as in Step S17*e* in FIG. 6. In the operation in the external sound capture mode in FIG. 6, the process of attenuating the fourth sound signal may be omitted and the second sound signal may be mixed with the unattenuated fourth sound signal.

In the operation in the external sound capture mode, the output of music content from loudspeaker 28 may be suppressed by at least one of the following processes: a process of stopping the output of the fourth sound signal from mobile terminal 30, a process of setting the amplitude of the fourth sound signal to 0, a process of stopping the mixing in mixing circuit 27*b* (i.e. not mixing the fourth sound signal), etc. In other words, in the external sound capture mode, the music content may be inaudible to the user.

4. Example 2

Ear-worn device 20 may have a noise canceling function (hereafter also referred to as "noise canceling mode") of reducing environmental sound around the user wearing ear-worn device 20 during the reproduction of the fourth sound signal (music content).

First, the noise canceling mode will be described below. When the user performs an operation of instructing UI 31 in mobile terminal 30 to set the noise canceling mode, CPU 33 transmits a setting command for setting the noise canceling mode in ear-worn device 20, to ear-worn device 20 using communication circuit 32. Once communication circuit 27*a* in ear-worn device 20 has received the setting command, switch 24*f* operates in the noise canceling mode.

Figure 7:
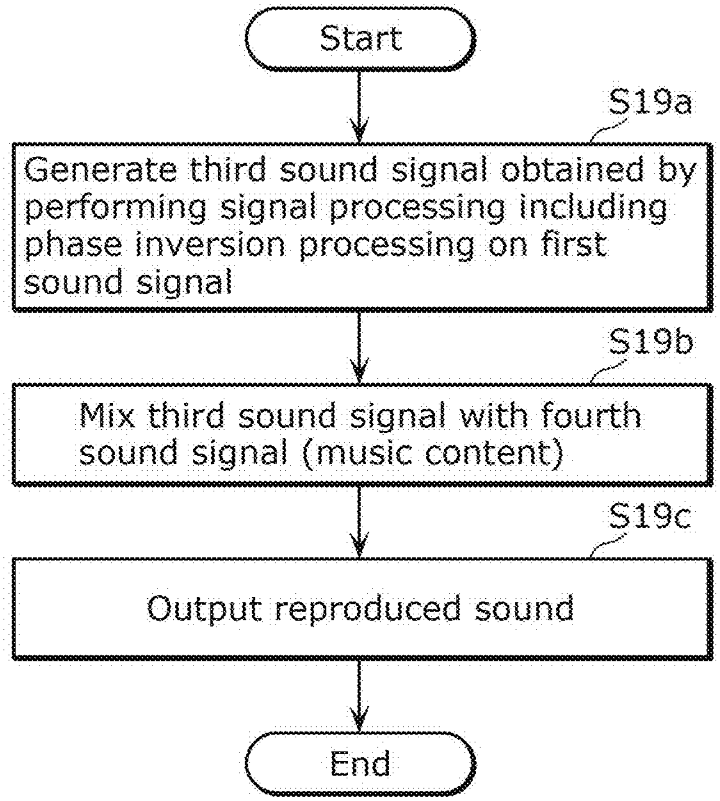
FIG. 7 is a flowchart of the operation of the ear-worn device according to the embodiment in a noise canceling mode.

FIG. 7 is a flowchart of operation in the noise canceling mode. In the noise canceling mode, switch 24*f* performs signal processing including phase inversion processing on the first sound signal output from microphone 21, and outputs the resultant sound signal as the third sound signal (S19*a*). The signal processing may include equalizing processing, gain increase processing, or the like, other than phase inversion processing. For example, the specific frequency component is a frequency component of 100 Hz or more and 2 kHz or less.

Mixing circuit 27*b* mixes the third sound signal with the fourth sound signal (music content) received by communication circuit 27*a*, and outputs the resultant sound signal to loudspeaker 28 (S19*b*). Loudspeaker 28 outputs a reproduced sound based on the third sound signal mixed with the fourth sound signal (S19*c*). Since it sounds to the user of ear-worn device 20 that the sound around ear-worn device 20 has been attenuated as a result of the processes in Steps S19*a* and S19*b*, the user can clearly hear the music content.

Figure 8:
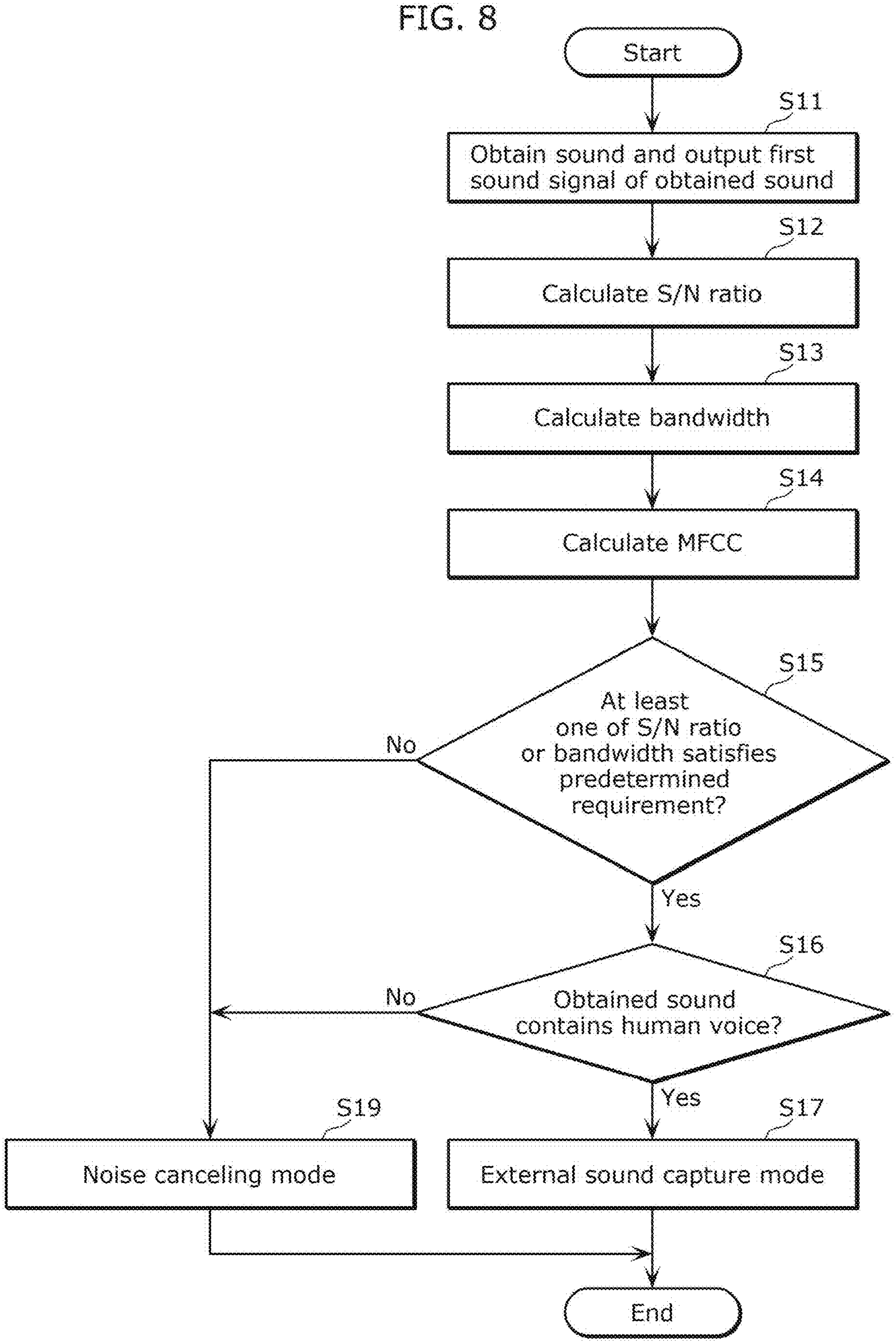
FIG. 8 is a flowchart of Example 2 of the ear-worn device according to the embodiment.

Example 2 in which ear-worn device 20 operates in the noise canceling mode instead of the normal mode will be described below. FIG. 8 is a flowchart of Example 2 of ear-worn device 20. Example 2 is an example of operation when the user wearing ear-worn device 20 is on a mobile body.

The processes in Steps S11 to S14 in FIG. 8 are the same as the processes in Steps S11 to S14 in Example 1 (FIG. 4).

After Step S14, determiner 24*e* determines whether at least one of the S/N ratio calculated in Step S12 or the bandwidth calculated in Step S13 satisfies a predetermined requirement (S15). The details of the process in Step S15 are the same as those of Step S15 in Example 1 (FIG. 4). Specifically, determiner 24*e* determines whether at least one of the requirement that the S/N ratio calculated in Step S12 is higher than the first threshold or the requirement that the bandwidth calculated in Step S13 is narrower than the second threshold is satisfied.

When determiner 24*e* determines that at least one of the S/N ratio or the bandwidth satisfies the predetermined requirement (S15: Yes), determiner 24*e* determines whether the sound obtained by microphone 21 contains human voice based on the MFCC calculated by speech feature value calculator 24*d* (S16). The details of the process in Step S16 are the same as those of Step S16 in Example 1 (FIG. 4).

When determiner 24*e* determines that the sound obtained by microphone 21 contains human voice (S16: Yes), switch 24*f* switches the operation mode from the noise canceling mode to the external sound capture mode and operates in the external sound capture mode (S17). In other words, when determiner 24*e* determines that at least one of the S/N ratio or the bandwidth satisfies the predetermined requirement (S15: Yes) and human voice is output (S16: Yes), ear-worn device 20 (switch 24*f*) operates in the external sound capture mode (S17). The operation in the external sound capture mode is as described above with reference to FIG. 5, FIG. 6, etc. Since the announcement sound is enhanced as a result of the operation in the external sound capture mode, the user of ear-worn device 20 can easily hear the announcement sound.

When determiner 24*e* determines that neither the S/N ratio nor the bandwidth satisfies the predetermined requirement (S15 in FIG. 8: No) and when determiner 24*e* determines that the sound does not contain human voice (S15: Yes, and S16: No), switch 24*f* operates in the noise canceling mode (S19). The operation in the noise canceling mode is as described above with reference to FIG. 7.

The above-described process illustrated in the flowchart in FIG. 8 is repeatedly performed at predetermined time intervals. That is, which of the noise canceling mode and the external sound capture mode ear-worn device 20 is to operate in is determined at predetermined time intervals. The predetermined time interval is, for example, 1/60 seconds.

Thus, when DSP 22 determines that neither the S/N ratio nor the bandwidth satisfies the predetermined requirement or when DSP 22 determines that the sound does not contain human voice, DSP 22 outputs the third sound signal obtained by performing phase inversion processing on the first sound signal. Loudspeaker 28 outputs a reproduced sound based on the output third sound signal.

Hence, ear-worn device 20 can assist the user who is on the mobile body in clearly hearing the music content while the mobile body is moving.

Figure 9:
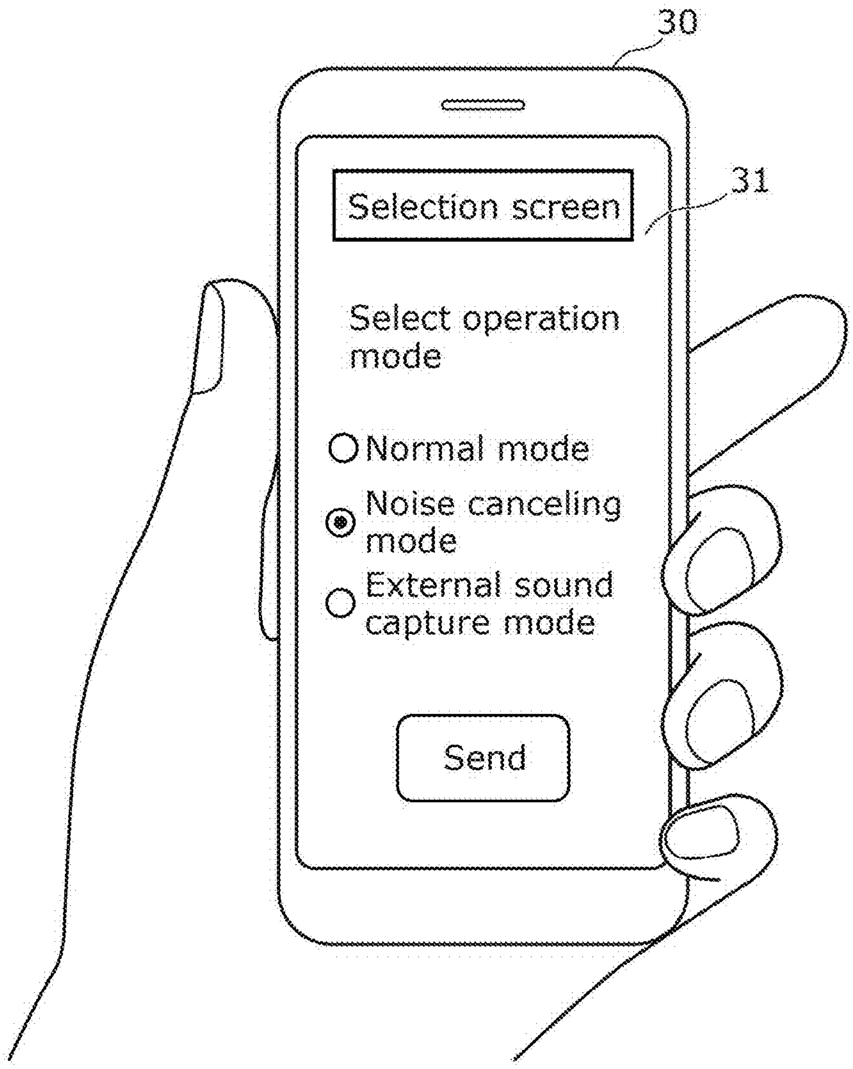
FIG. 9 is a diagram illustrating an example of an operation mode selection screen.

When the user instructs UI 31 in mobile terminal 30 to set the noise canceling mode, for example, a selection screen illustrated in FIG. 9 is displayed on UI 31. FIG. 9 is a diagram illustrating an example of an operation mode selection screen. As illustrated in FIG. 9, the operation modes selectable by the user include, for example, three modes of the normal mode, the noise canceling mode, and the external sound capture mode. That is, ear-worn device 20 may operate in the external sound capture mode based on operation on mobile terminal 30 by the user.

When the operation mode is changed based on the user's selection, CPU 33 transmits an operation mode switching command to ear-worn device 20 via communication circuit 32 based on the operation mode selection operation received by UI 31. Switch 24*f* in ear-worn device 20 obtains the operation mode switching command via communication circuit 27*a*, and switches the operation mode based on the obtained operation mode switching command.

5. Effects, etc.

As described above, ear-worn device 20 includes: microphone 21 that obtains a sound and outputs a first sound signal of the sound obtained; DSP 22 that performs determination regarding a signal-to-noise (S/N) ratio of the first sound signal, determination regarding a bandwidth with respect to a peak frequency in a power spectrum of the sound, and determination of whether the sound contains human voice, and outputs a second sound signal based on the first sound signal when DSP 22 determines that at least one of the S/N ratio or the bandwidth satisfies a predetermined requirement and the sound contains human voice; loudspeaker 28 that outputs a reproduced sound based on the second sound signal output; and housing 29 that contains microphone 21, DSP 22, and loudspeaker 28. DSP 22 is an example of a signal processing circuit.

Such ear-worn device 20 can reproduce human voice heard in the surroundings. For example, when an announcement sound is output in a mobile body while the mobile body is moving, ear-worn device 20 can output a reproduced sound including the announcement sound from loudspeaker 28.

For example, when DSP 22 determines that at least one of the S/N ratio or the bandwidth satisfies the predetermined requirement and the sound contains human voice, DSP 22 outputs the first sound signal as the second sound signal.

Such ear-worn device 20 can reproduce human voice heard in the surroundings based on the first sound signal.

For example, when DSP 22 determines that at least one of the S/N ratio or the bandwidth satisfies the predetermined requirement and the sound contains human voice, DSP 22 outputs the second sound signal obtained by performing signal processing on the first sound signal.

Such ear-worn device 20 can reproduce human voice heard in the surroundings based on the first sound signal that has undergone the signal processing.

For example, the signal processing includes equalizing processing for enhancing a specific frequency component of the sound.

Such ear-worn device 20 can enhance and reproduce human voice heard in the surroundings.

For example, when DSP 22 determines that neither the S/N ratio nor the bandwidth satisfies the predetermined requirement or when DSP 22 determines that the sound does not contain human voice, DSP 22 causes loudspeaker 28 not to output the reproduced sound based on the second sound signal.

Such ear-worn device 20 can stop the output of the reproduced sound based on the second sound signal, for example in the case where no human voice is heard in the surroundings.

For example, when DSP 22 determines that neither the S/N ratio nor the bandwidth satisfies the predetermined requirement or when DSP 22 determines that the sound does not contain human voice, DSP 22 outputs a third sound signal obtained by performing phase inversion processing on the first sound signal, and loudspeaker 28 outputs a reproduced sound based on the third sound signal output.

Such ear-worn device 20 can make ambient sound less audible, for example in the case where no human voice is heard in the surroundings.

For example, the predetermined requirement for the S/N ratio is that the S/N ratio is higher than a first threshold, and the predetermined requirement for the bandwidth is that the bandwidth is narrower than a second threshold.

Such ear-worn device 20 can reproduce human voice heard in the surroundings when it is assumed that the S/N ratio is low due to excessive noise, that is, when the human voice heard in the surroundings is buried in excessive noise.

For example, ear-worn device 20 further includes: mixing circuit 27*b* that mixes the second sound signal output with a fourth sound signal provided from a sound source. After DSP 22 starts outputting the second sound signal, mixing circuit 27*b* mixes the second sound signal with the fourth sound signal attenuated to be lower in amplitude than before DSP 22 starts outputting the second sound signal.

Such ear-worn device 20 can enhance and reproduce human voice heard in the surroundings.

A reproduction method executed by a computer such as DSP 22 includes: Steps S15 and S16 of performing, based on a first sound signal of a sound obtained by microphone 21, determination regarding a signal-to-noise (S/N) ratio of the first sound signal, determination regarding a bandwidth with respect to a peak frequency in a power spectrum of the sound, and determination of whether the sound contains human voice, the first sound signal being output from microphone 21; Step 17*a* (or 17*d*) of outputting a second sound signal based on the first sound signal when it is determined that at least one of the S/N ratio or the bandwidth satisfies a predetermined requirement and the sound contains human voice; and Step 17*c* (or 17*f*) of outputting a reproduced sound from loudspeaker 28 based on the second sound signal output.

Such a reproduction method can reproduce human voice heard in the surroundings.

Other Embodiments

While the embodiment has been described above, the present disclosure is not limited to the foregoing embodiment.

For example, although the foregoing embodiment describes the case where the ear-worn device is an earphone-type device, the ear-worn device may be a headphone-type device. Although the foregoing embodiment describes the case where the ear-worn device has the function of reproducing music content, the ear-worn device may not have the function (the communication circuit and the mixing circuit) of reproducing music content. For example, the ear-worn device may be an earplug or a hearing aid having the noise canceling function and the external sound capture function.

Although the foregoing embodiment describes the case where a machine learning model is used to determine whether the sound obtained by the microphone contains human voice, the determination may be made based on another algorithm without using a machine learning model, such as speech feature value pattern matching.

The structure of the ear-worn device according to the foregoing embodiment is an example. For example, the ear-worn device may include structural elements not illustrated, such as a D/A converter, a filter, a power amplifier, and an A/D converter.

Although the foregoing embodiment describes the case where the sound signal processing system is implemented by a plurality of devices, the sound signal processing system may be implemented as a single device. In the case where the sound signal processing system is implemented by a plurality of devices, the functional structural elements in the sound signal processing system may be allocated to the plurality of devices in any way. For example, all or part of the functional structural elements included in the ear-worn device in the foregoing embodiment may be included in the mobile terminal.

The method of communication between the devices in the foregoing embodiment is not limited. In the case where the two devices communicate with each other in the foregoing embodiment, a relay device (not illustrated) may be located between the two devices.

The orders of processes described in the foregoing embodiment are merely examples. A plurality of processes may be changed in order, and a plurality of processes may be performed in parallel. A process performed by any specific processing unit may be performed by another processing unit. Part of digital signal processing described in the foregoing embodiment may be realized by analog signal processing.

Each of the structural elements in the foregoing embodiment may be implemented by executing a software program suitable for the structural element. Each of the structural elements may be implemented by means of a program executing unit, such as a CPU or a processor, reading and executing the software program recorded on a recording medium such as a hard disk or semiconductor memory.

Each of the structural elements may be implemented by hardware. For example, the structural elements may be circuits (or integrated circuits). These circuits may constitute one circuit as a whole, or may be separate circuits. These circuits may each be a general-purpose circuit or a dedicated circuit.

The general or specific aspects of the present disclosure may be implemented using a system, a device, a method, an integrated circuit, a computer program, or a computer-readable recording medium such as CD-ROM, or any combination of systems, devices, methods, integrated circuits, computer programs, and recording media. For example, the presently disclosed techniques may be implemented as a reproduction method executed by a computer such as an ear-worn device or a mobile terminal, or implemented as a program for causing the computer to execute the reproduction method. The presently disclosed techniques may be implemented as a computer-readable non-transitory recording medium having the program recorded thereon. The program herein includes an application program for causing a general-purpose mobile terminal to function as the mobile terminal in the foregoing embodiment.

Other modifications obtained by applying various changes conceivable by a person skilled in the art to each embodiment and any combinations of the structural elements and functions in each embodiment without departing from the scope of the present disclosure are also included in the present disclosure.

INDUSTRIAL APPLICABILITY

The ear-worn device according to the present disclosure can output a reproduced sound containing human voice in the surroundings, according to the ambient noise environment.

The invention claimed is:

1. An ear-worn device comprising:

a microphone that obtains a sound and outputs a first sound signal of the sound obtained;

a signal processing circuit that performs determination regarding a signal-to-noise (S/N) ratio of the first sound signal, determination regarding a bandwidth with respect to a peak frequency in a power spectrum of the sound, and determination of whether the sound contains human voice, and outputs a second sound signal based on the first sound signal when the signal processing circuit determines that at least one of the S/N ratio or the bandwidth satisfies a predetermined requirement and the sound contains human voice;

a loudspeaker that outputs a reproduced sound based on the second sound signal output; and a housing that contains the microphone, the signal processing circuit, and the loudspeaker.

2. The ear-worn device according to claim 1, wherein when the signal processing circuit determines that at least one of the S/N ratio or the bandwidth satisfies the predetermined requirement and the sound contains human voice, the signal processing circuit outputs the first sound signal as the second sound signal.

3. The ear-worn device according to claim 2, wherein the predetermined requirement for the S/N ratio is that the S/N ratio is higher than a first threshold, and the predetermined requirement for the bandwidth is that the bandwidth is narrower than a second threshold.

4. The ear-worn device according to claim 1, wherein when the signal processing circuit determines that at least one of the S/N ratio or the bandwidth satisfies the predetermined requirement and the sound contains human voice, the signal processing circuit outputs the second sound signal obtained by performing signal processing on the first sound signal.

5. The ear-worn device according to claim 4, wherein the signal processing includes equalizing processing for enhancing a specific frequency component of the sound.

6. The ear-worn device according to claim 1, wherein when the signal processing circuit determines that neither the S/N ratio nor the bandwidth satisfies the predetermined requirement or when the signal processing circuit determines that the sound does not contain human voice, the signal processing circuit causes the loudspeaker not to output the reproduced sound based on the second sound signal.

7. The ear-worn device according to claim 1, wherein when the signal processing circuit determines that neither the S/N ratio nor the bandwidth satisfies the predetermined requirement or when the signal processing circuit determines that the sound does not contain human voice, the signal processing circuit outputs a third sound signal obtained by performing phase inversion processing on the first sound signal, and the loudspeaker outputs a reproduced sound based on the third sound signal output.

8. The ear-worn device according to claim 1, further comprising:

a mixing circuit that mixes the second sound signal output with a fourth sound signal provided from a sound source, wherein after the signal processing circuit starts outputting the second sound signal, the mixing circuit mixes the second sound signal with the fourth sound signal attenuated to be lower in amplitude than before the signal processing circuit starts outputting the second sound signal.

9. A reproduction method comprising:

performing, based on a first sound signal of a sound obtained by a microphone, determination regarding a signal-to-noise (S/N) ratio of the first sound signal, determination regarding a bandwidth with respect to a peak frequency in a power spectrum of the sound, and determination of whether the sound contains human voice, the first sound signal being output from the microphone;

outputting a second sound signal based on the first sound signal when it is determined that at least one of the S/N ratio or the bandwidth satisfies a predetermined requirement and the sound contains human voice; and outputting a reproduced sound from a loudspeaker based on the second sound signal output.

10. A non-transitory computer-readable recording medium having recorded thereon a program for causing a computer to execute the reproduction method according to claim 9.

* * * * *